United States Patent
Hopson

[11] Patent Number: 5,823,883
[45] Date of Patent: *Oct. 20, 1998

[54] CONSTANT VELOCITY JOINT WITH REACTIVE CAGE

[75] Inventor: Michael W. Hopson, Clinton Township, Mich.

[73] Assignee: Ford Motor Company, Dearborn, Mich.

[*] Notice: This patent issued on a continued prosecution application filed under 37 CFR 1.53(d), and is subject to the twenty year patent term provisions of 35 U.S.C. 154(a)(2).

[21] Appl. No.: 743,585

[22] Filed: Nov. 4, 1996

[51] Int. Cl.⁶ .................................................. F16D 3/16
[52] U.S. Cl. .................................... 464/145; 464/906
[58] Field of Search ...................................... 464/145, 906

[56] References Cited

U.S. PATENT DOCUMENTS

| | | | |
|---|---|---|---|
| 1,524,161 | 1/1925 | Weiss | 464/145 |
| 2,182,455 | 12/1939 | Smith | 464/145 |
| 3,785,172 | 1/1974 | Parsons | 464/906 X |
| 4,116,020 | 9/1978 | Aucktor et al. | 464/145 |
| 4,126,361 | 11/1978 | Bottner et al. | |
| 4,708,498 | 11/1987 | Labedan et al. | |
| 5,067,929 | 11/1991 | Krude . | |
| 5,086,560 | 2/1992 | Glazier . | |
| 5,201,107 | 4/1993 | Mazziotti | 464/906 X |
| 5,222,914 | 6/1993 | Mazziotti . | |
| 5,288,273 | 2/1994 | Krude . | |
| 5,368,523 | 11/1994 | Mazziotti . | |
| 5,433,668 | 7/1995 | Harz et al. . | |
| 5,451,185 | 9/1995 | Krude et al. . | |
| 5,453,052 | 9/1995 | Harz et al. . | |

FOREIGN PATENT DOCUMENTS

| | | | |
|---|---|---|---|
| 543849 | 7/1957 | Italy | 464/145 |

*Primary Examiner*—Donald P. Walsh
*Assistant Examiner*—Emmanuel M. Marcelo
*Attorney, Agent, or Firm*—James J. Dottavio

[57] ABSTRACT

A constant velocity universal joint includes an inner race having an outer surface with ball tracks. An outer race having an inner surface with ball tracks corresponding to the ball tracks of the inner race is provided adjacent the inner race. Balls are provided between the ball tracks of the inner and outer races. A stem assembly, including ball pockets and a spherical surface provided therebetween, is secured to the outer race. A cage is provided between the inner and outer races. The cage has apertures for the balls, a spherical surface corresponding with the spherical surface of the stem assembly. The spherical surface is positioned in an abutting condition with the stem, and a spring section is provided between the spherical surface of the cage and the ball apertures.

22 Claims, 1 Drawing Sheet

CONSTANT VELOCITY JOINT WITH REACTIVE CAGE

BACKGROUND OF THE INVENTION

1. Field of the Invention

This invention relates to a constant velocity universal joint for use in an automotive vehicle.

2. Discussion of the Prior Art

U.S. Pat. No. 5,288,273, to Krude ('273 patent), describes a constant velocity joint, including an outer joint portion with a plurality of meridional ball tracks, a hub with a plurality of undercut, free meridional ball tracks, and a plurality of balls provided therebetween. A cage is provided to retain the balls. The cage contacts the outer joint portion and the hub. The '273 patent provides partial regions of the outer joint portions and ball hub positioned between contact regions of same, which are not in contact with the cage due to free space recesses to minimize the machining thereof.

The constant velocity joint designs of the prior art when manufactured are subjected to manufacturing variations and tolerances from the processes used to form the components. Such tolerances and variations provide for clearance in the joint assembly. Therefore, it is desirable in such designs to more precisely control the machining of the components and incorporate finishing operations in the manufacture thereof. It would therefore be desirable to provide a constant velocity joint design having a means to take up the manufacturing tolerance and reduce the precision by which the components must be made. Furthermore, it would be desirable to provide an assembly which facilitates ease of assembly thereof.

SUMMARY OF THE INVENTION

In accordance with the objects of the present invention, a constant velocity joint is provided having a means to take up manufacturing tolerance and variations to minimize the clearance in the assembly thereof. Furthermore, the present invention is designed in a manner which facilitates the assembly thereof.

Advantages of the present invention include reduced manufacturing costs, since finishing operations are eliminated or minimized. Furthermore, the tolerance of the components is less critical in the present invention. The present invention further reduces assembly costs due to the simplicity of the components.

A constant velocity universal joint is provided, comprising an inner race having an outer surface with ball tracks. An outer race having an inner surface with ball tracks corresponding to the ball tracks of the inner race is provided adjacent the inner race. Balls are provided between the ball tracks of the inner and outer races. A stem assembly, including ball pockets and a spherical surface provided therebetween, is secured to the outer race. A cage is provided between the inner and outer races. The cage has apertures for the balls, a spherical surface corresponding with the spherical surface of the stem assembly. The spherical surface is positioned in an abutting condition with the stem and a spring section is provided between the spherical surface of the cage and the ball apertures.

DETAILED DESCRIPTION OF THE PREFERRED EMBODIMENT

Figure 1:
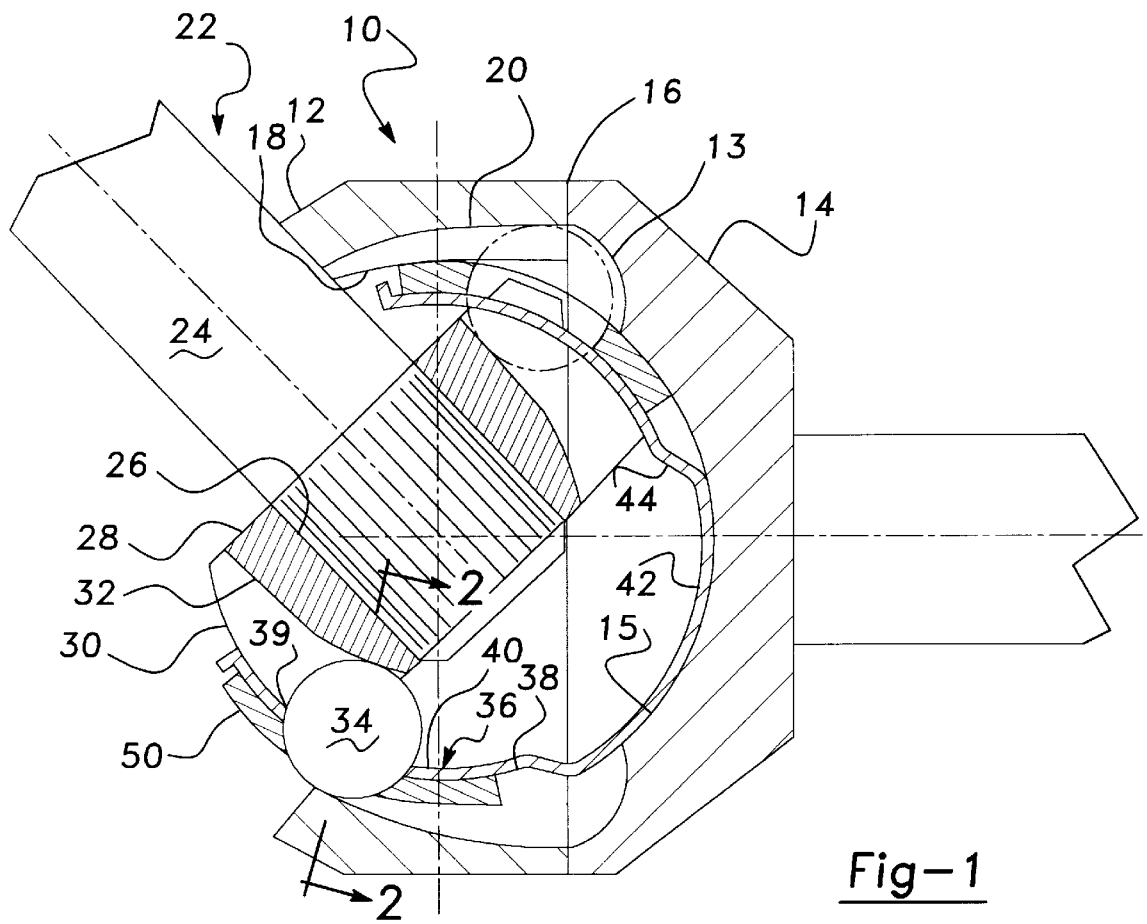
FIG. 1 shows a partial sectional side view of a constant velocity joint according to the present invention.
Figure 2:
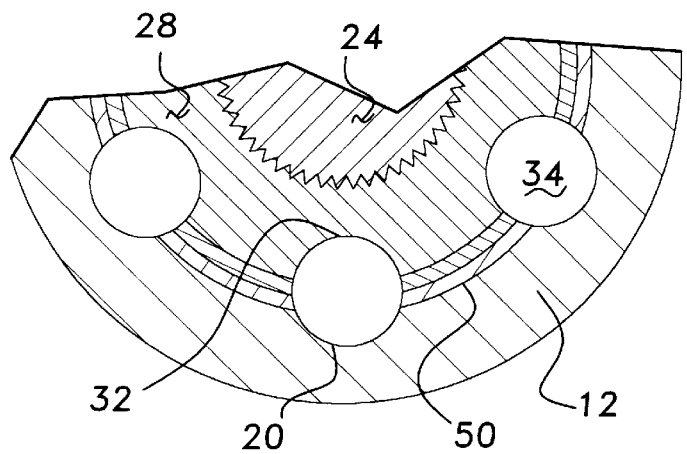
FIG. 2 shows a partial sectional view through the constant velocity joint shown in FIG. 1 at line 2—2.

In FIG. 1, a partial sectional side view of a constant velocity joint assembly 10 according to the present invention is shown. An outer race 12 is preferably welded to the stem 14 of the constant velocity joint at the interface 16 therebetween. The outer race comprises a substantially spherical inner face 18, which is provided with a plurality of circumferentially spaced undercut free outer tracks 20 running out into ball pockets 13 formed in the stem 14 portion adjacent the outer race 12. The stem 14 includes a spherical portion 15 adjacent the outer race 12.

An input end 22 of the constant velocity joint 10 includes a shaft 24 having a splined 26 or welded connection to an inner race 28. The inner race 28 has a substantially spherical outer surface 30 in which are formed a plurality of inner tracks 32, which are undercut free and spaced correspondingly parallel the outer tracks 20. A ball 34 is inserted between each inner and outer track 32, 20 so as to be movable in the longitudinal direction.

In a preferred embodiment, a constant velocity joint as described with reference to the Figures is used in an outboard position on an automotive halfshaft. The input shaft 24 of the constant velocity joint 10 is driven by a transaxle or differential (not shown), typically through a plunging constant velocity joint (not shown). The constant velocity joint 10 transmits torque to the output stem 14, which subsequently provides torque to a wheel (not shown) of the motor vehicle as is well known in the art. The joint 10 provides for articulation of the driveline during operation of the motor vehicle as is well known in the art.

As shown in the Figures, a cage 36 is provided between the inner and outer races 28, 12 to keep the balls 34 in one plane, particularly when the joint 10 is articulated. The cage 36 comprises a spherical outer face 38 corresponding substantially to the inner face 18 of the outer race 12 and an inner face 40 corresponding to the outer face 30 of the inner race 28. The cage 36 includes pockets 39 formed therein to guide and retain the balls 34 in a homokinetic plane. The cage 36 also includes a portion 42, which is matched to the internal spherical surface 15 of the stem 14. A spring portion 44 is provided in the cage 36 between the inner race 28 and the spherical portion 15 of the stem 14. The spring portion 44 provides an axial force with the inner race 28 to maintain contact with the inner 28 and outer races 12 and thereby compensate for any manufacturing tolerances in the formation of the various components of the constant velocity joint 10. Preferably, the cage 36 is stamped from sheet metal, but it is envisioned that the cage could be formed from an alternative material having suitable wear and spring characteristics such as an engineered composite material.

The inner portion of the cage 36 includes a spherically shaped surface 40, which corresponds to the spherically shaped outer surface 30 of the inner race 28. Thus, as the cage 36 is forced axially away from the spherical surface 15 of the stem 14 due to the spring action provided by the cage 36, the relative position of the inner 28 and outer races 12 is maintained.

A matching cage ring 50 is preferably provided between the cage 36 and the spherical surface 18 provided by the inner surface of the outer race 12 and the spherical portion 15 of the stem 14 adjacent to the cage 36. This matching cage ring 50 provides further resistance against axial movement of the inner race 28 and cage 36 relative to the outer race 12. As the two races 12, 28 are forced axially toward one another, the cage 36 is forced outwardly toward the outer race 12 and spherical portion 15 of the stem 14. The matching cage ring 50 thus prevents further movement of the cage 36 outwardly, and relative movement of the races 12, 28 is further impeded.

Preferably, the joint 10 components are measured and a gap is calculated, which determines the proper thickness of the ring 50. Classes of thickness of the matching cage rings 50 are matched to the spherical inside diameter 18 of the outer race 12. The rings 50 are formed with varying thickness, so that components of the constant velocity joint 10 having different dimensions may be selected with a matching cage ring 50, which compensates for any variation therebetween. The matching cage ring 50 thus compensates for increased tolerances of the components which are used as-formed, as opposed to prior art joints which finish machine the components using processes such as grinding and other finish machining which increase the precision of individual parts.

Materials for this matching cage ring include metal or nonferrous plastic engineered composites and other known materials. Alternatively, the matching cage ring 50 may be formed from stamped sheet metal of varying thickness. Furthermore, the ring 50 may be formed using powder metals, bronze, or any other suitable material or method. Alternatively, a Belleville wave spring could be used for the matching cage ring 50 and thereby eliminate the size matching process described above.

The inner race 28, outer race 12, and stem 14 may thus be utilized as-formed, without additional machining of the inner surfaces to ensure a proper fit. The ball tracks 20, 32 and spherical surfaces 18, 30 of the outer race 12 and inner race 28 are designed as undercut-free to improve the forming process and thereby reduce cost and the tolerance ability of the forming processes. The spherical inside diameter 15 and ball relief pockets 13 of the stem 14 are also undercut-free.

The assembly process of the above mentioned components comprises assembling an inner race 28, balls 34, and cage 36. An outer race 12 is selected and the matching cage ring 50 is installed between the subassembled inner race 28 and the outer race 12. The stem 14 is then assembled to the outer race 12 and welded thereto 16 preferably using a laser weld process.

While the above detailed description describes the preferred embodiment of the present invention, numerous modifications are envisioned which may be made without departing from the true spirit and scope of the present invention.

I claim:

1. A constant velocity universal joint comprising:
   an inner race having an outer surface with a plurality of ball tracks provided therein;
   an outer race having an inner surface with a plurality of ball tracks corresponding to the ball tracks of the inner race positioned adjacent the inner race;
   a plurality of balls provided between the ball tracks of the inner and outer races;
   a stem assembly including a plurality of ball pockets and a spherical surface provided therebetween secured to the outer race;
   a cage provided between the inner and outer races, said cage having a plurality of apertures for said balls and a spherical surface corresponding with the spherical surface of the stem assembly positioned in an abutting condition with said stem; and
   a spring means provided between the spherical surface of the cage and said ball apertures for urging said cage axially from said stem assembly.

2. A constant velocity joint according to claim 1, further comprising a spacing means provided between said cage and one of said races to maintain a relative distance therebetween.

3. A constant velocity joint assembly according to claim 2, wherein the spacing means comprises a matching cage ring positioned between the cage and outer race.

4. A constant velocity joint according to claim 3, wherein matching cage ring is made from an engineered composite material.

5. A constant velocity joint according to claim 4, wherein said spring means is integrally formed in said cage.

6. A constant velocity joint according to claim 5, wherein said cage is a unitary member.

7. A constant velocity universal joint comprising:
   an inner race having an outer surface with a plurality of ball tracks provided therein;
   an outer race having an inner surface with a plurality of ball tracks corresponding to the ball tracks of the inner race positioned adjacent the inner race;
   a plurality of balls provided between the ball tracks of the inner and outer races;
   a stem assembly including a plurality of ball pockets and a spherical surface provided therebetween secured to the outer race;
   a cage provided between the inner and outer races, said cage having a plurality of apertures for said balls and a spherical surface corresponding with the spherical surface of the stem assembly positioned in an abutting condition with said stem; and
   a spring means provided between the spherical surface of the cage and said ball apertures for urging said cage axially from said stem assembly, said spring means comprising said cage having a curvilinear portion between the spherical surface of the cage and said ball apertures, and said cage curvilinear portion having a bend formed therein for permitting deflection of the cage between the curvilinear portion and the spherical surface.

8. A constant velocity joint according to claim 1, wherein the spring means is integrally formed in said cage.

9. A constant velocity joint according to claim 8, further comprising a spacing means provided between said cage and one of said races to maintain a relative distance therebetween.

10. A constant velocity joint assembly according to claim 9, wherein the spacing means comprises a matching cage ring.

11. A constant velocity fixed universal joint comprising:
    an inner race having an outer surface with a plurality of ball tracks provided therein;
    an outer race having an inner surface with a plurality of ball tracks corresponding to the ball tracks of the inner race positioned adjacent the inner race;
    a plurality of balls provided between the ball tracks of the inner and outer races;
    a stem assembly including a plurality of ball pockets and a spherical surface provided therebetween secured to the outer race;
    a cage provided between the inner and outer races, said cage having a plurality of apertures for said balls and a spherical surface corresponding with the spherical surface of the stem assembly positioned in an abutting condition with said stem;

said cage having a curvilinear portion between the spherical surface of the cage and said ball apertures; and said cage curvilinear portion having a bend formed therein for permitting deflection of the cage between the curvilinear portion and the spherical surface to maintain a relative position of the inner race to the outer race.

12. A constant velocity joint according to claim 11, wherein the curvilinear portion and bend are integrally formed in said cage.

13. A constant velocity joint according to claim 12, wherein said cage is a unitary member.

14. A constant velocity joint according to claim 12, further comprising a spacing means provided between said cage and one of said races to maintain a relative distance therebetween.

15. A constant velocity joint assembly according to claim 14, wherein said spacing means comprises a matching cage ring.

16. A constant velocity joint according to claim 15, wherein said matching cage ring is made from an engineered composite material.

17. A constant velocity universal joint comprising an inner race having an outer surface with a plurality of ball tracks provided therein;

an outer race having an inner surface with a plurality of ball tracks corresponding to the ball tracks of the inner race positioned adjacent the inner race;

a plurality of balls provided between the ball tracks of the inner and outer races;

a stem assembly including a plurality of ball pockets and a spherical surface provided therebetween secured to the outer race;

a cage provided between the inner and outer races, said cage having a plurality of apertures for said balls and a spherical surface corresponding with the spherical surface of the stem assembly positioned in an abutting condition with said stem; and a spring means provided between the spherical surface of the cage and said ball apertures for urging said inner race axially from said outer race 18. A constant velocity joint according to claim 17, further comprising a spacing means provided between said cage and one of said races to maintain a relative distance therebetween.

19. A constant velocity joint assembly according to claim 18, wherein the spacing means comprises a matching cage ring positioned between the cage and outer race.

20. A constant velocity joint according to claim 18, wherein said spring means is integrally formed in said cage.

21. A constant velocity joint according to claim 20, wherein said cage is a unitary member.

22. A constant velocity joint according to claim 20, wherein said spring means further comprises said cage having a spherical surface corresponding with the spherical surface of the stem assembly positioned in an abutting condition with said stem and said cage having a curvilinear portion between the spherical surface of the cage and said ball apertures, said cage curvilinear portion having a bend formed therein for permitting deflection of the cage between the curvilinear portion and the spherical surface to maintain a relative position of the inner race to the outer race.

* * * * *